United States Patent
Miura

(10) Patent No.: US 8,013,565 B2
(45) Date of Patent: Sep. 6, 2011

(54) MOTOR CONTROL DEVICE, CONTROL METHOD, AND CONTROL PROGRAM

(75) Inventor: Tetsuya Miura, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 358 days.

(21) Appl. No.: 12/309,526

(22) PCT Filed: Mar. 7, 2008

(86) PCT No.: PCT/JP2008/054691
§ 371 (c)(1),
(2), (4) Date: Jan. 22, 2009

(87) PCT Pub. No.: WO2008/126630
PCT Pub. Date: Oct. 23, 2008

(65) Prior Publication Data
US 2009/0284202 A1 Nov. 19, 2009

(30) Foreign Application Priority Data
Mar. 29, 2007 (JP) .................................. 2007-086427

(51) Int. Cl.
*H02P 23/00* (2006.01)
(52) U.S. Cl. .......................................... 318/811; 318/473
(58) Field of Classification Search ............. 318/65.285, 318/473; 700/170; 702/127, 130, 133, 136
See application file for complete search history.

(56) References Cited

U.S. PATENT DOCUMENTS

| 6,781,333 B2 * | 8/2004 | Koide et al. ................... 318/432 |
| 6,854,881 B2 | 2/2005 | Nada |
| 7,099,793 B2 | 8/2006 | Rechberger |
| 7,804,261 B2 * | 9/2010 | Atarashi et al. ............... 318/139 |

(Continued)

FOREIGN PATENT DOCUMENTS

EP 1 263 125 A2 12/2002

(Continued)

OTHER PUBLICATIONS

Aglen et al; "Thermal analysis of a high-speed generator;" *Conference Record of the Industry Applications Conferences 2003 38th IAS Annual Meeting*; Oct. 12, 2003; pp. 547-554; vol. 1.

(Continued)

*Primary Examiner* — Walter Benson
*Assistant Examiner* — Jorge L Carrasquillo
(74) *Attorney, Agent, or Firm* — Oliff & Berridge, PLC

(57) ABSTRACT

The temperature of a stator coil is measured by a temperature sensor (14), amplified by a stator coil temperature amplifier (21), and transmitted to a vehicle control section (23). Further, motor cooling oil (17) for cooling the outer periphery of the stator cools the stator coil (16) along an end coil section of the stator coil (16). The temperature of the motor cooling oil raised by the stator coil (16) is measured by a temperature sensor (15) and transmitted also to the vehicle control section (23) via a motor cooling oil temperature amplifier (22). The vehicle control section (23) estimates the temperature of a rotor magnet based on a thermal model (relationship between temperature, a heat production amount, and heat resistance) of the motor cooling oil, the stator coil, and the rotor magnet by using the motor cooling oil temperature and the stator coil temperature as input values and sends a control instruction to a motor control section (24).

6 Claims, 7 Drawing Sheets

U.S. PATENT DOCUMENTS

2004/0257011 A1* 12/2004 Rechberger .................. 318/139
2006/0250154 A1   11/2006 Gao et al.

FOREIGN PATENT DOCUMENTS

| | | |
|---|---|---|
| JP | A-06-153381 | 5/1994 |
| JP | A-11-055810 | 2/1999 |
| JP | A-2000-023421 | 1/2000 |
| JP | A-2001-318008 | 11/2001 |
| JP | A-2002-354888 | 12/2002 |
| JP | A-2005-073333 | 3/2005 |
| JP | A-2005-521374 | 7/2005 |

OTHER PUBLICATIONS

European Search Report dated Oct. 19, 2010 in corresponding European Patent Application No. 08 722 088.5.

* cited by examiner

EXPERIMENTAL RESULTS BY ACTUAL MEASUREMENT

EXPERIMENTAL RESULTS BY ACTUAL MEASUREMENT

MOTOR CONTROL DEVICE, CONTROL METHOD, AND CONTROL PROGRAM

BACKGROUND OF INVENTION

1. Field of the Invention

The present invention relates to a motor control device for operating a motor having a stator with a stator coil concentrically arranged on the outer side of a rotor having a permanent magnet, the motor control device including magnet temperature estimating means for estimating a temperature of the permanent magnet, and control means for controlling the motor based on the estimated magnet temperature. The present invention also relates to a control method and a control program of such motors.

2. Description of the Related Art

Recently, there has been increasing interest in hybrid vehicles, electric vehicles, and vehicles powered by fuel cells, and various attempts have been made to improve the driving performance of such vehicles to go beyond conventional vehicles driven by internal combustion engines. For example, in hybrid vehicles, attempts to increase the energy efficiency of vehicles to improve the driving performance are under way by using higher voltages, modifying the motor driving system, and so on.

Use of the motor in higher output state for an extended period of time, however, may cause the stator and rotor to exceed its upper limit temperature, which leads to demagnetization of the permanent magnet of the rotor. This results in a decreased torque of the motor. To avoid this, it is important to control the motor to not exceed the upper limit temperature, while improving the cooling ability of the motor, so as to restrict the rise in internal temperature of the motor.

For precise control of the motor temperature, the temperature of the rotor and stator should be measured. Typically, the stator is fixedly attached to the motor casing, and the temperature of the stator can be measured easily by attaching a thermocouple to the stator. However, because the rotor continues to rotate inside the stator, a slip ring or a rotary connector is needed on the shaft of the rotor to take out signals from the thermocouple attached to the stator. As a result, the cost of the motor might increase and the structure of the motor becomes more complicated.

Japanese Patent Laid-Open Publication No. 2005-73333 discloses a technique to estimate the temperature of a magnetic sensor, a bearing, a rotor magnet, and so on, by previously measuring and storing a temperature distribution of the motor, detecting a temperature of the stator coil using a plurality of thermistors, and comparing the detected temperature values against the stored temperature distribution of the motor.

In addition, Japanese Patent Laid-Open Publication No. 2000-23421 discloses another technique to estimate the temperature of the rotor magnet, in which the oil cooling system on the stator side is separated from that on the rotor side, the flow rate of the cooling oil circulating through the oil cooling system of the rotor is measured, and the temperature of the incoming cooling oil and the outgoing cooling oil, respectively, before and after the rotor is cooled by the rotor cooling system is also measured to estimate the temperature of the rotor magnet based on the difference of temperature of the cooling oil.

SUMMARY OF THE INVENTION

In the above techniques disclosed in Japanese Patent Laid-Open publications Nos. 2005-73333 and 2000-23421, a mutual relationship of the rotor magnet, the stator coil, and the cooling oil has not been found, nor is there any consideration given to the thermal influence on the entire motor, i.e., how the stator coil and the cooling liquid, which thermally affect the rotor magnet, relate to the temperature of the rotor magnet.

In addition, the technique disclosed in Japanese Patent Laid-Open publications No. 2000-23421 estimates the temperature of the rotor magnet based on the temperature of the motor cooling oil. As the motor is controlled in a more complicated way to attain higher output, the rotor magnet itself produces an increased amount of heat, which hampers a sufficiently precise estimation of the temperature using conventional estimation methods. This is especially true with the motors used in hybrid vehicles in which the driving state changes momently, because the temperature of the rotor magnet might include a predetermined error if the temperature is estimated only from the motor cooling oil.

To solve the above problems, the purpose of the present invention is to provide a small and high performance motor by providing a control device of a motor, including magnet temperature estimating means for estimating a temperature of a permanent magnet incorporated in a rotor of the motor, and control means for controlling the motor based on the estimated magnet temperature. The present invention also provides a control method and a control program of the motor.

To achieve the above object, a control device according to the present invention operates a motor having a stator with a stator coil concentrically arranged on the outer side of a rotor having a permanent magnet, the motor control device including magnet temperature estimating means for estimating a temperature of the permanent magnet, and control means for controlling the motor based on the estimated magnet temperature. The motor includes cooling means for cooling the outer periphery of the stator, liquid temperature detecting means for detecting a temperature of a cooling liquid, and coil temperature detecting means for detecting a temperature of the stator coil. The magnet temperature estimating means predetermines a thermal resistance ratio, which is given by comparing a thermal resistance between the cooling liquid and the stator coil with a thermal resistance between the stator coil and the permanent magnet. The magnet temperature estimating means also predetermines a heat production ratio between the stator coil and the permanent magnet. During operation of the motor, the magnet temperature is calculated based on the temperature of the stator coil and the cooling liquid, the heat production ratio, and the thermal resistance ratio.

Further, in the motor control device according to the present invention, the control means controls the motor by switching between the PWM control and the square wave control. The magnet temperature estimating means calculates the temperature in accordance with a change of the thermal ratio caused by switching between the PWM control and the square wave control.

The motor control method according to the present invention operates a motor having a stator with a stator coil concentrically arranged on the outer side of a rotor having a permanent magnet, the motor control method including the steps of detecting a temperature of the stator coil while it produces heat, detecting a temperature of the cooling liquid for cooling the outer periphery of the stator, estimating a temperature of the permanent magnet while it produces heat, and controlling the motor based on the estimated magnet temperature. The step of estimating the magnet temperature predetermines a thermal resistance ratio, which is given by comparing a thermal resistance between the cooling liquid
} and the stator coil with a thermal resistance between the stator coil and the permanent magnet. The step of estimating the magnet temperature also predetermines a heat production ratio between the stator coil and the permanent magnet. During operation of the motor, the magnet temperature is calculated based on the temperature of the stator coil and the cooling liquid, the heat production ratio, and the thermal resistance ratio.

Further, in the motor control method according to the present invention, the control step controls the motor by switching between the PWM control and the square wave control. The magnet temperature estimating step calculates the temperature in accordance with a change of the thermal ratio caused by switching between the PWM control and the square wave control.

The control program according to the present invention operates a motor having a stator with a stator coil concentrically arranged on the outer side of a rotor having a permanent magnet. In response to the operation of the motor, the motor control program causes a computer to execute the steps of detecting a temperature of the heating stator coil, detecting a temperature of the cooling liquid for cooling the outer periphery of the stator, estimating a temperature of the heating permanent magnet, and controlling the motor based on the estimated magnet temperature. The step of estimating the magnet temperature predetermines a thermal resistance ratio, which is given by comparing a thermal resistance between the cooling liquid and the stator coil with a thermal resistance between the stator coil and the permanent magnet. The step of estimating the magnet temperature also predetermines a heat production ratio between the stator coil and the permanent magnet. During operation of the motor, the magnet temperature is calculated based on the temperature of the stator coil and the cooling liquid, the heat production ratio, and the thermal resistance ratio.

Further, in the motor control program according to the present invention, the control step controls the motor by switching between the PWM control and the square wave control. The magnet temperature estimating step calculates the temperature in accordance with a change of the thermal ratio caused by switching between the PWM control and the square wave control.

Advantageously, the present invention calculates the temperature of the rotor magnet based on a plurality of parameters, so that the rotor magnet temperature can be estimated precisely and the motor can be controlled properly.

Also, the present invention calculates the temperature of the rotor magnet using the predetermined heat production ratio and the heat resistance ratio and also using the temperature of the easily measurable part of the motor, so that the rotor magnet temperature can be calculated without increasing the computational load of the computer.

DETAILED DESCRIPTION OF EXAMPLE EMBODIMENTS

An embodiment of the present invention (referred to as "the embodiment" hereinafter) will be described below with reference to the attached drawings.

Figure 1:
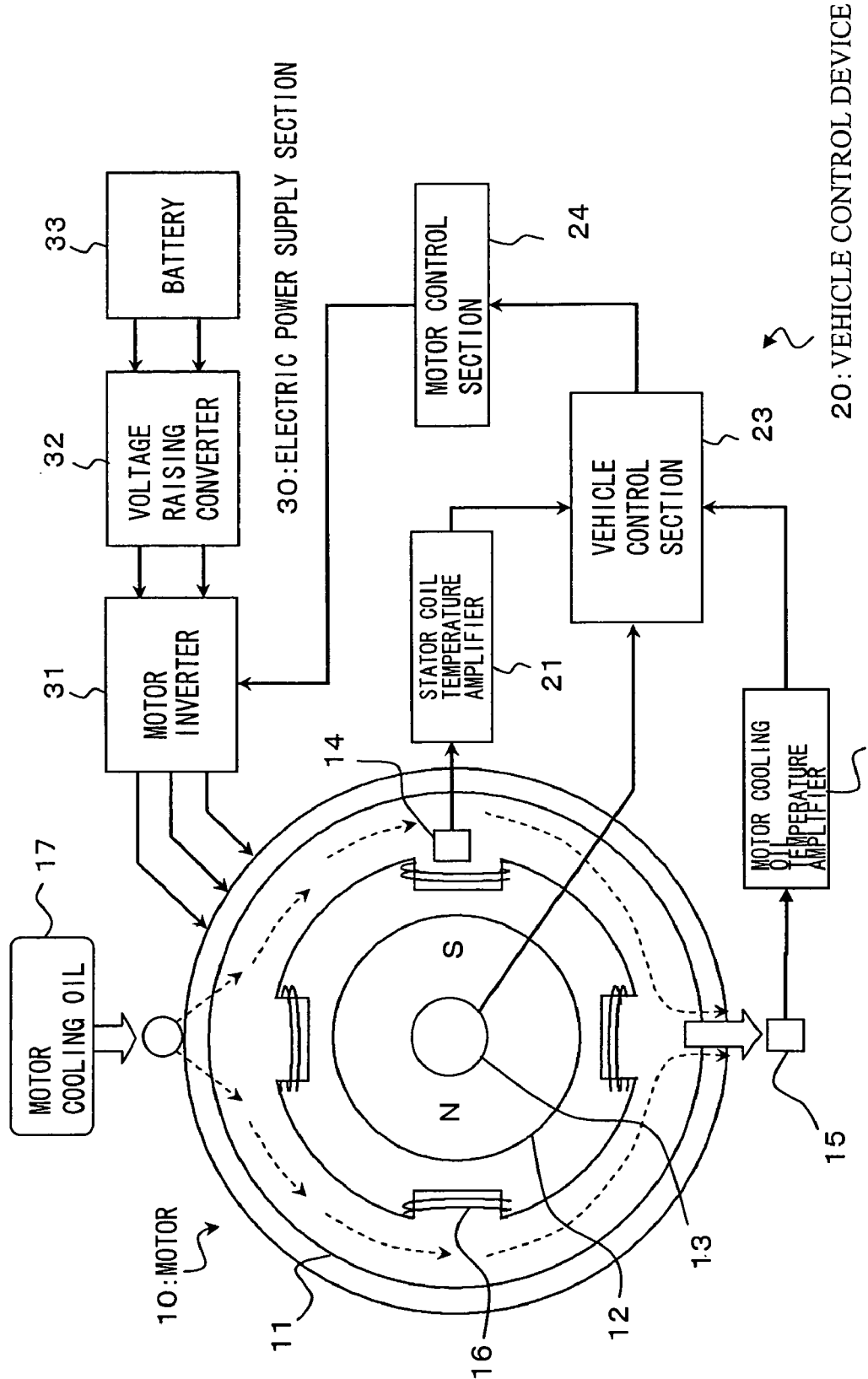
FIG. 1 shows a structure of a motor control device for controlling a motor according to an embodiment of the present invention.

FIG. 1 shows a motor control device 20 for controlling a motor 10. The motor 10 includes a rotor 12 having a permanent magnet, a reservoir 13 provided in the rotor 12, a stator 11 arranged on the outer side of the rotor 12 and having a stator coil 16, and a temperature sensor 14 for detecting the temperature of the stator coil 16.

A motor control device 20 for controlling the motor 10 includes a stator coil temperature amplifier 21, a motor cooling oil temperature amplifier 22, a vehicle control section 23, and a motor control section 24. Further, a power supply section 30 for supplying electric power to the motor 10 includes a battery 33, a voltage raising converter 32 for raising a voltage of the battery, and a motor inverter 31 for supplying electric power to the motor 10 in response to an instruction from the motor control section 24.

The temperature of the stator coil is detected by a temperature sensor 14, amplified by the stator coil temperature amplifier 21, and transmitted to the vehicle control section 23. Motor cooling oil 17 for cooling the outer periphery of the stator cools the stator coil 16 along the end coil section (shown in a dotted line in FIG. 1). The temperature of the motor cooling oil raised by the stator coil 16 is measured by a temperature sensor 15 and also transmitted to the vehicle control section 23 via the motor cooling oil temperature amplifier 22.

The vehicle control section 23 estimates the temperature of the rotor magnet based on a thermal model (relationship between temperature, a heat production amount, and heat resistance) of the motor cooling oil, the stator coil 16, and the rotor magnet 12 by using the motor cooling oil temperature and the stator coil temperature as input values, and sends a control instruction to the motor control section 24.

Figure 2:
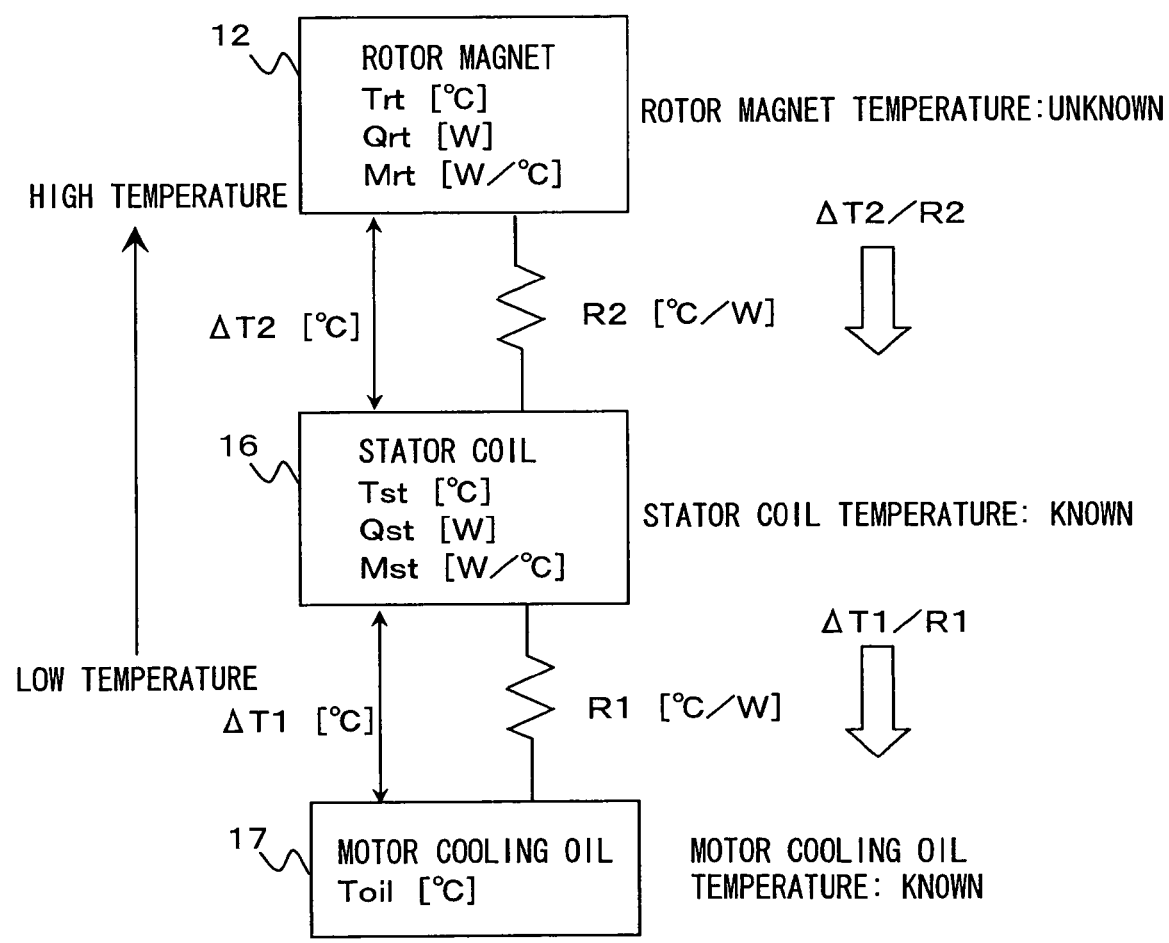
FIG. 2 explains a thermal model of the motor according to an embodiment of the present invention.

FIG. 2 is a thermal model of the motor, where the motor cooling oil 17, the stator coil 16, and the rotor magnet 12 are shown in this order from the bottom of the figure to the top along the temperature range, with thermal resistance (R1, R2) and temperature difference (ΔT1, ΔT2) for each component being indicated.

Referring to FIG. 2, the temperature of the stator coil Tst while it is in the transient state is defined by an expression (1). It is noted that the heat production amount Qrt of the rotor magnet 12 can be ignored, as it is smaller than (e.g., about 1/10) that of the stator coil.

$$Tst = Qst.R1\{1-\exp(-t/Mst/R1)\} + Toil \quad (1)$$

where Tst [C] is the temperature of the stator coil, Qst [W] is the heat production amount of the stator coil, Mst [W/C] is the thermal conductivity of the stator coil, Toil [C] is the temperature of the motor cooling oil, and R1 [C/W] is the thermal resistance between the stator coil and the motor cooling oil.

As "t" is infinite during the normal state, the value of exp(−t/Mst/R1) becomes so small that it can be ignored, and the temperature of the stator coil Tst is simply given as:

$$Tst = Qst.R1 + Toil \quad (2)$$

Transposing "Toil" from the right side of the expression (2) to the left side gives an expression (3) to define the temperature difference between the stator coil and the motor cooling oil:

$$Tst - Toil = Qst.R1 = \Delta T1 \quad (3)$$

where $\Delta T1$ [C] is the temperature difference between the stator coil and the motor cooling oil.

Next, the temperature of the rotor magnet Trt while it is in the transient state is defined by an expression (4).

$$Trt = Qrt.R2\{1 - \exp(-t/Mrt/R2)\} + Tst \quad (4)$$

where Trt [C] is the temperature of the rotor magnet, Qrt [W] is the heat production amount of the rotor magnet, Mrt [W/C] is the thermal conductivity of the rotor magnet, and R2 [C/W] is the thermal resistance between the stator coil and the rotor magnet.

As "t" is infinite during the normal state, the value of $\exp(-t/Mrt/R2)$ becomes so small that it can be ignored, and the temperature of the rotor magnet Trt is simply given as:

$$Trt = Qrt.R2 + Tst \quad (5)$$

Transposing "Tst" from the right side of the expression (5) to the left side gives an expression (6) to define the temperature difference between the rotor magnet and the stator coil:

$$Trt - Tst = Qrt.R2 = \Delta T2 \quad (6)$$

where $\Delta T2$ [C] is the temperature difference between the stator coil and the rotor magnet. Dividing the expression (6) by the expression (3) gives $\Delta T2/\Delta T1$ as:

$$\Delta T2/\Delta T1 = Qrt/Qst.R2/R1 \quad (7)$$

Further, the expression (7) can be modified to give another expression (8) defining the temperature of the rotor magnet:

$$Trt = Tst + \Delta T2 = Tst + Qrt/Qst.R2/R1 \Delta T1 \, Trt = Tst + Qrt/Qst.R2/R1.(Tst - Toil) \quad (8)$$

Since the temperature of the stator coil Tst and the temperature of the motor cooling oil Toil are given by actual measurement results, and $Qrt/Qst.R2/R1$ is given by the previous measurement, it is possible to calculate the temperature of the rotor magnet using the expression (8).

Figure 7:
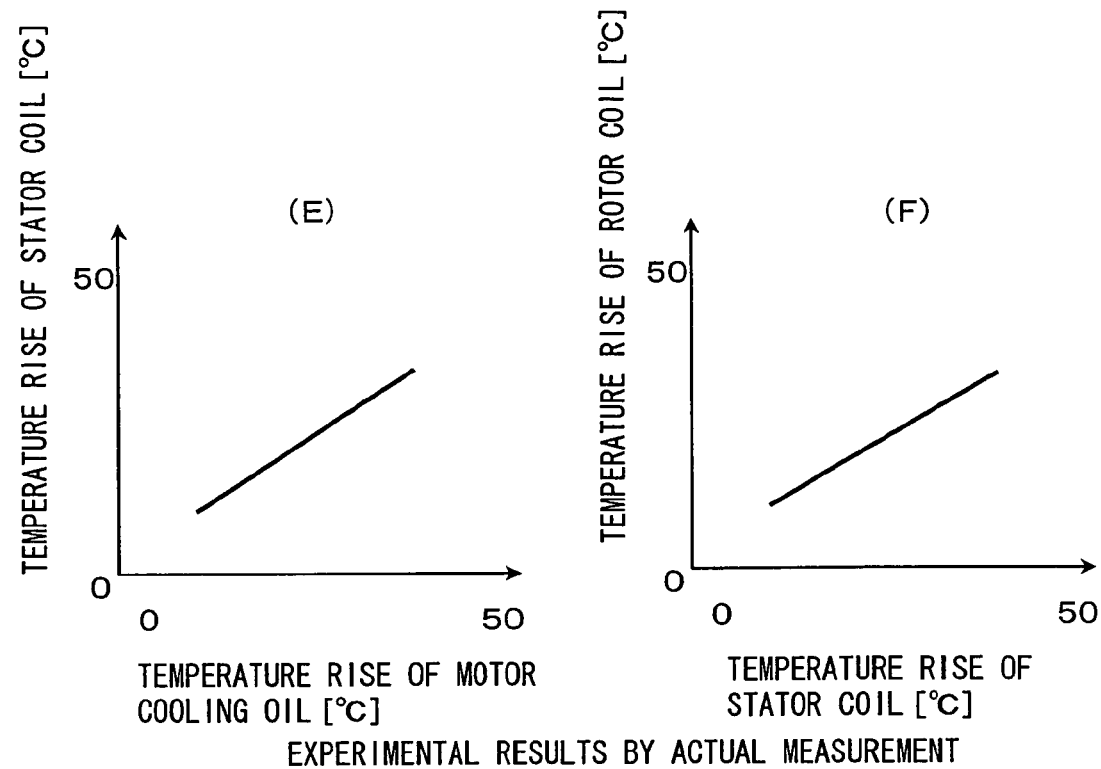
FIG. 7 shows experimental results and correlations given by actual measurement.
Figure 7:
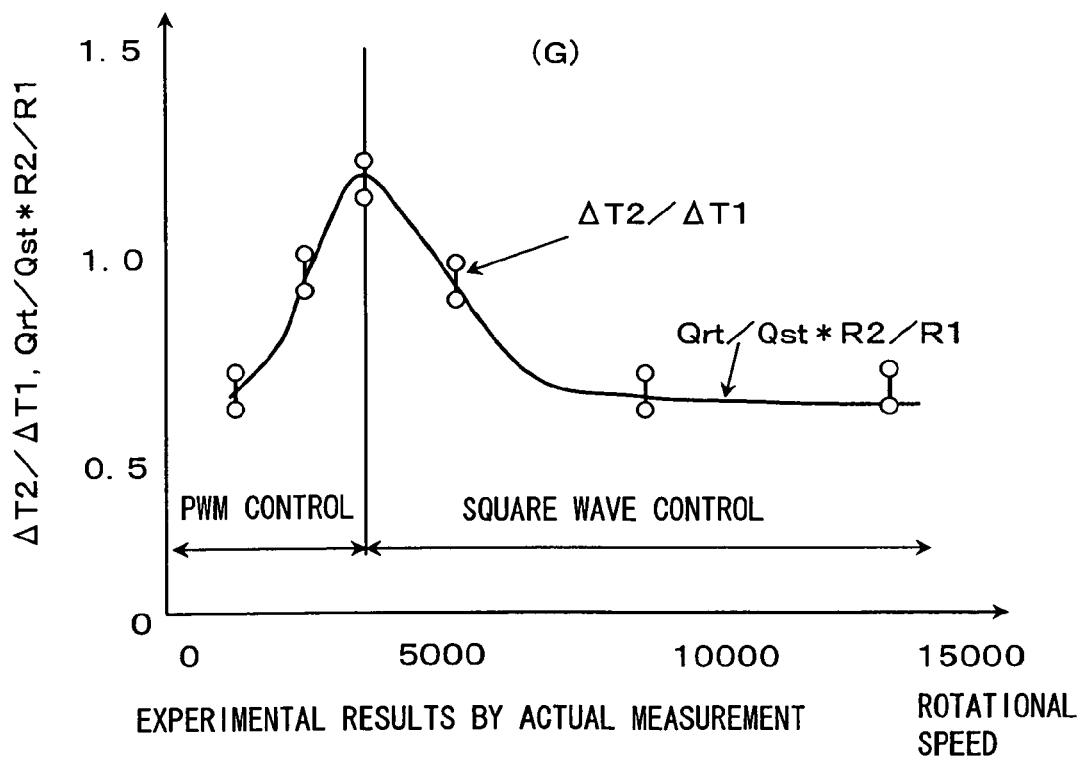

Experimental results from actual measurement are shown in FIG. 7. In the experiment, a special vehicle was made for experimental use only so as to enable measurement of the temperature of the rotor magnet using a slip ring provided on the motor shaft. FIG. 7 (E) shows a proportional relationship between the temperature rise of the stator coil and the motor cooling oil. Also, FIG. 7 (F) shows a proportional relationship between the temperature rise of the stator coil and the rotor magnet. Thus, it is confirmed that a predetermined proportional relationship exists between the temperature rise of the motor cooling oil and the rotor magnet.

FIG. 7(G) plots $\Delta T2/\Delta T1$ (shown by circles in the figure) given from the temperature values Tst, Trt, and Toil, over the $Qrt/Qst*R2/R1$ curve that is obtained by calculation. In FIG. 7(G), the heat production amount soars in the vicinity of the rotational speed of about 4,000 rpm (or about 80 km/h), probably because high frequency noise due to the PWM control has affected the rotor magnet to increase its heat production amount. According to the experimental results, it is found that the R2/R1 can be calculated to give a fixed value of about 3.5 after correcting values near the crossing of the PWM control and the square wave control.

Figure 5:
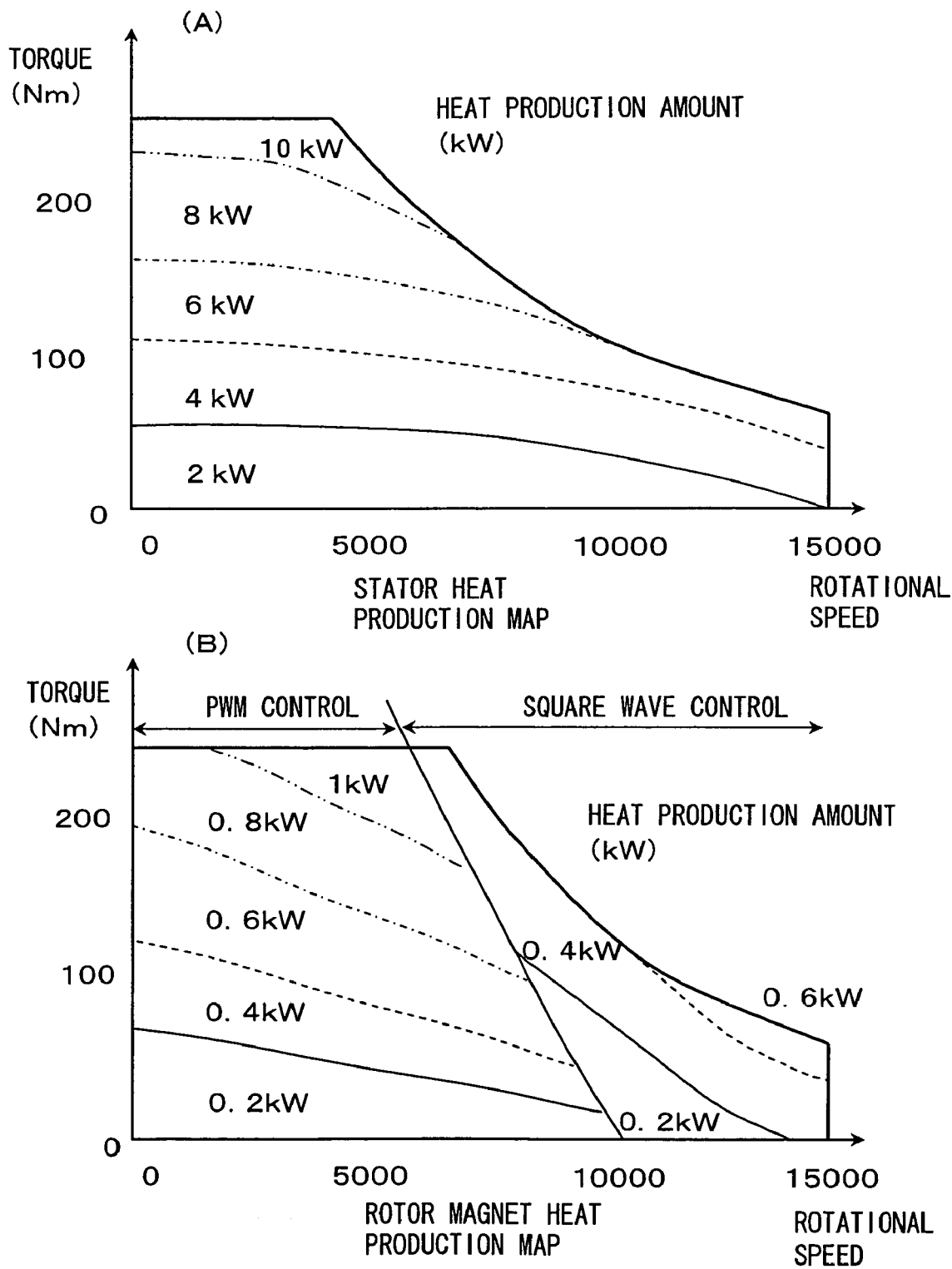
FIG. 5 shows a heat production map of the stator coil and a heat production map of the rotor magnet, respectively.
Figure 6:
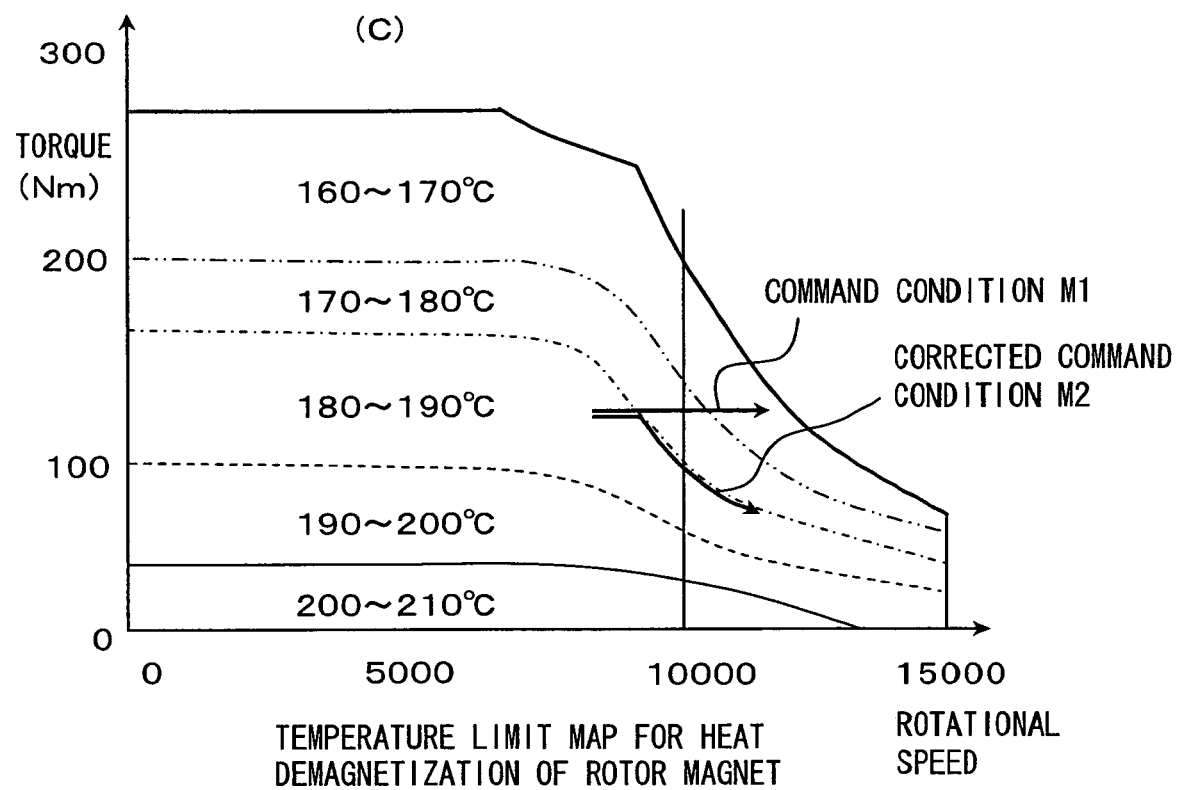
FIG. 6 shows a temperature limit map for heat demagnetization of the rotor magnet.

Next, to explain the process flow of calculating the rotor magnet temperature shown in FIG. 3, the map data used in the process will be described. FIG. 5(A) shows a heat production map of the stator coil, FIG. 5(B) shows a heat production map of the rotor magnet, and FIG. 6(C) shows a temperature limit map for heat demagnetization of the rotor magnet.

Referring to the heat production map of the stator coil shown in FIG. 5(A), the heat production amount shown in contour lines is approximately ten times that of the heat production map of the rotor magnet shown in FIG. 5(B). In addition, a discontinuous heat production characteristic appears in the heat production map of the rotor magnet shown in FIG. 5(B) after the PWM control is switched to the square wave control. Therefore, a discontinuous heat production characteristic also appears in the temperature limit map for heat demagnetization of the rotor magnet shown in FIG. 6 in the range of the rotational speed from 5,000 rpm to 10,000 rpm.

In the temperature limit map for heat demagnetization of the rotor magnet shown in FIG. 6(C), the limit temperature for heat demagnetization that occurs due to a weak magnetic field created in response to the activation of the motor is divided into 5 ranges from 160 to 210 degrees C. Under each operational condition determined by a combination of rotational speed and torque, the rotor magnet needs to be operated at or below the corresponding temperature limit for heat demagnetization.

Figure 3:
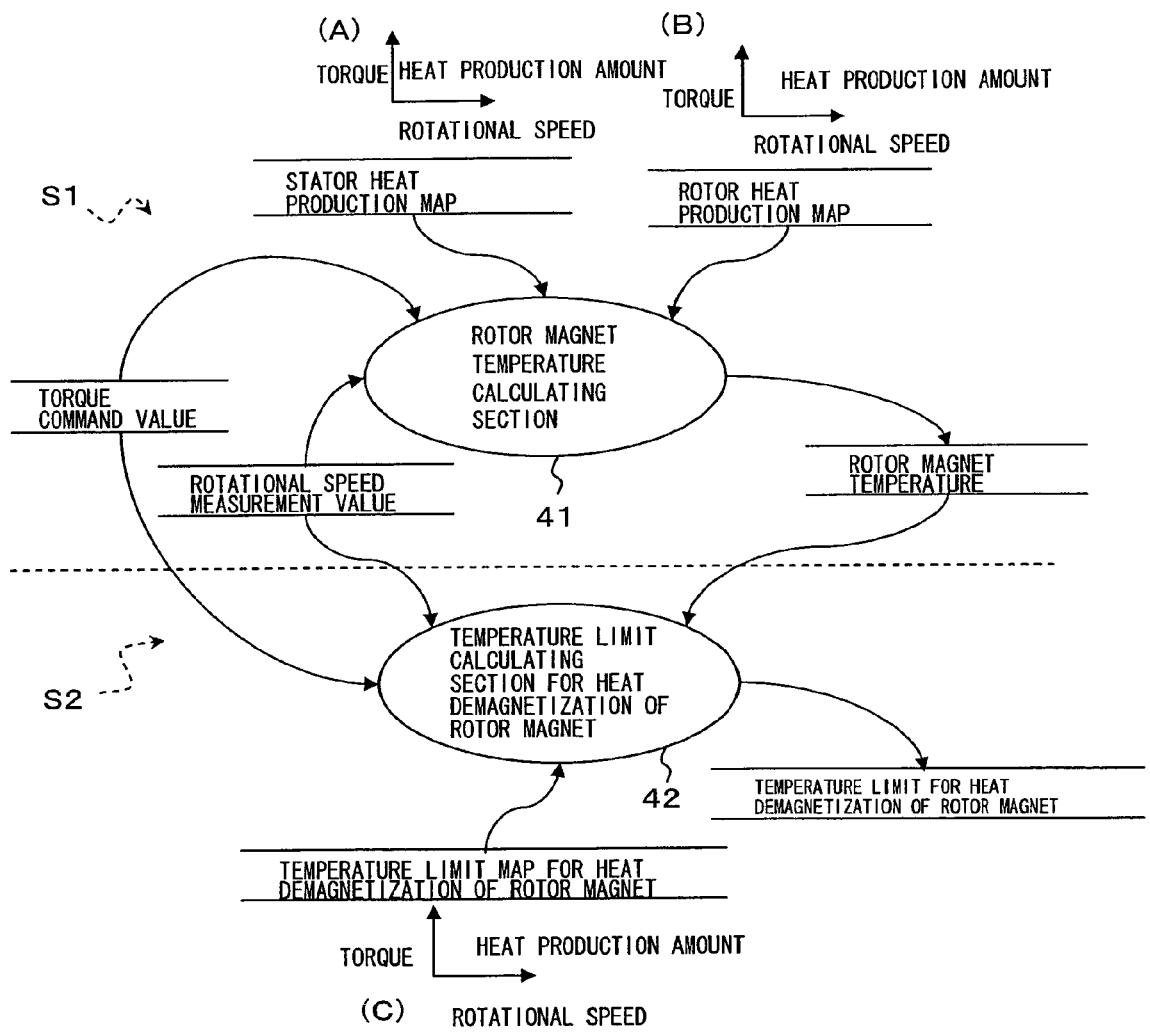
FIG. 3 shows a calculation flow to calculate a motor magnet temperature according to an embodiment of the present invention.

Referring to FIG. 3, a flow of calculation of the rotor magnet temperature will be described. To calculate the temperature limit for heat demagnetization of the rotor magnet, a rotor magnet temperature is calculated (step S1), and then the temperature limit for heat demagnetization of the rotor magnet is calculated (step S2). In Step S1, a rotor magnet temperature calculating section 41 shown in FIG. 3 refers to a heat production amount (Qst, Qrt) indicated in the heat production map of the stator coil and the rotor magnet, respectively, in response to a torque command value which is supplied externally and a rotational speed measurement value detected by the reservoir 13. Further, an experimentally determined R2/R1 value is substituted in the expression (8) above to calculate the temperature of the rotor magnet.

Next, in step S2, a temperature limit calculating section for heat demagnetization of the rotor magnet 42 can read the temperature limit for heat demagnetization of the rotor magnet at a predetermined torque and rotational speed, based on the rotor magnet temperature calculated in step S1, and from the temperature limit map for heat demagnetization of the rotor magnet shown in FIG. 6(C).

For example, a command condition M1 shown in FIG. 6(C) represents an acceleration command to raise the rotational speed from 8,000 rpm to 12,000 rpm to obtain a torque of 140 Nm. In response to the input of this command, the temperature limit of the rotor magnet to obtain this torque changes from below 190 degrees C. for the rotational speed from 8,000 rpm to 9,000 rpm, to 180 degrees C. from 9,000 rpm to 11,000 rpm, and down to 170 degrees C. from 11,000 rpm to 12,000 rpm.

Assuming that the rotor temperature is 190 degrees C., the command condition M1 is limited and corrected as a command condition M2 to lower the torque down to 90 Nm, if it is desired to maintain the rotational speed. In contrast, if the torque is to be maintained, the rotational speed should be limited to 9,000 rpm.

Figure 4:
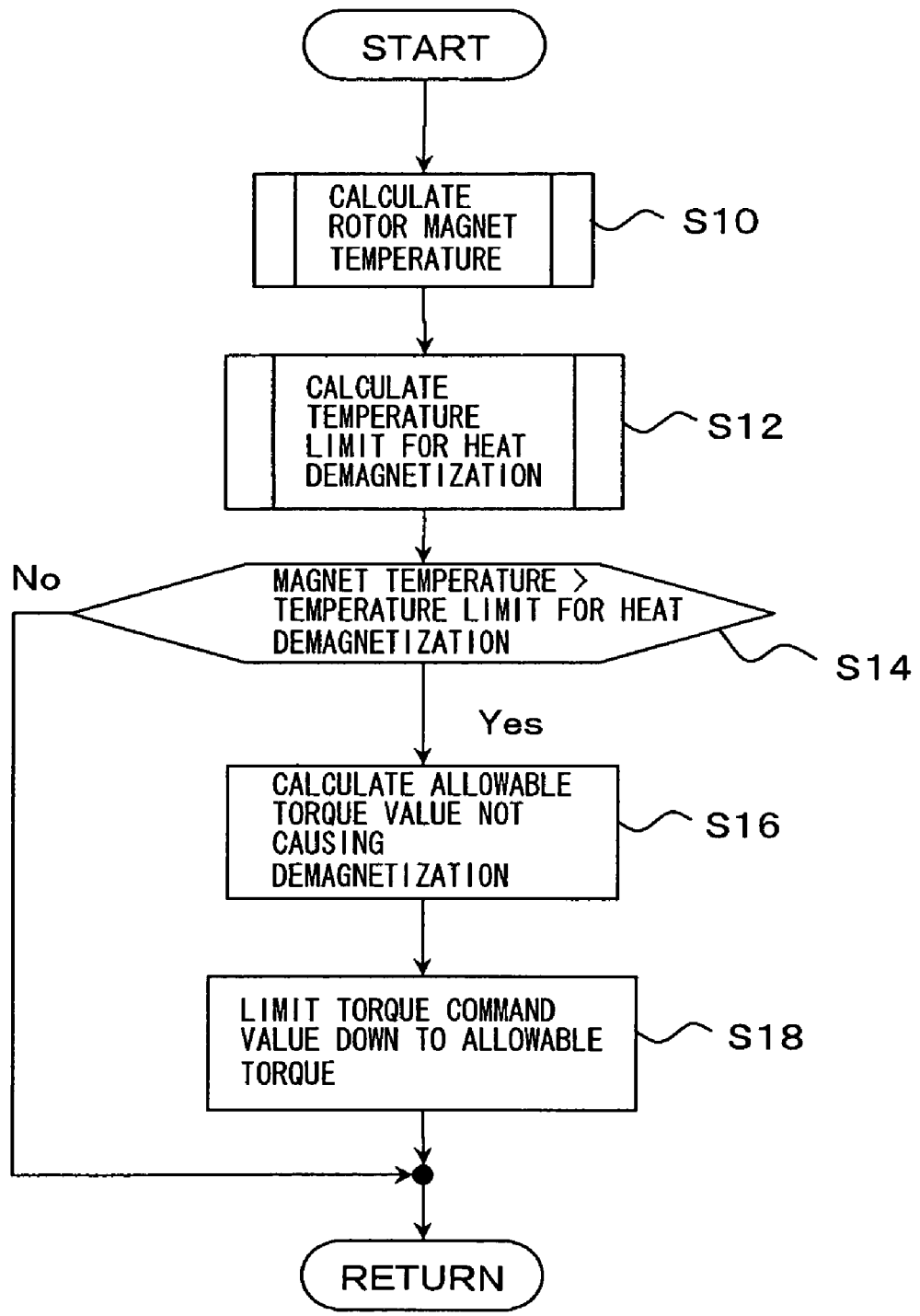
FIG. 4 is a flow chart showing the control process to prevent heat demagnetization of the motor magnet.

Referring to FIG. 4, the control process to protect the rotor magnet from heat demagnetization (referred to as "protect control" hereinafter) is shown. First, when the protect control starts from the main process, not shown in the figure, the temperature of the rotor is calculated in step S10, and the temperature limit for heat demagnetization of the rotor magnet is calculated in S12.

In step S14, if the temperature of the rotor magnet obtained from the previous calculation does not exceed the heat demagnetization limit temperature determined from the combination of rotational speed and torque, "No" is selected and a normal processing is carried out. In contrast, if the temperature exceeds the heat demagnetization limit temperature, "Yes" is selected and the process advances to step S16. In step S16, an allowable torque value not causing demagnetization is calculated. In step S18, the torque command value is limited to the allowable torque value, or otherwise the rotational speed is limited, to prevent the increase of the temperature of the rotor magnet, and then the process returns to the main process.

As described above, the embodiment of the present invention allows calculation of the temperature of the rotor magnet based on more than one parameter to enable more precise estimation of the temperature, so that the motor can be controlled appropriately. In addition, the temperature of the rotor magnet is calculated from the temperature of easily measurable parts of the motor, so that the processing can be carried out without increasing the computational load of the computer. Further, the control process of the motor is corrected by considering heat production of the rotor magnet caused by switching the control method of the motor, so that unexpected heat production of the rotor magnet can also be prevented.

It will be appreciated that the motor control for automobiles has been described in the above embodiment, but the present invention is not limited thereto and is also applicable to motors used in railway trains, robots, and other industrial devices in general. Further, specific numerical values used in the above description of the embodiment are only for the purpose of ease of description, and those values are not limited thereto and may be set appropriately depending on the motor characteristic, the control conditions, and so on.

What is claimed is:

1. A motor control device for operating a motor having a stator with a stator coil concentrically arranged on an outer side of a rotor having a permanent magnet, the motor control device comprising:
    magnet temperature estimating means for estimating a temperature of the permanent, magnet; and
    control means for controlling the motor based on the estimated magnet temperature,
    wherein the motor includes:
        means for cooling an outer periphery of the stator with a cooling liquid;
        liquid temperature detecting means for detecting a temperature of the cooling liquid; and
        coil temperature detecting means for detecting a temperature of the stator coil,
    the magnet temperature estimating means predetermines a thermal resistance ratio which is given by comparing a thermal resistance between the cooling liquid and the stator coil with a thermal resistance between the stator coil and the permanent magnet, the magnet temperature estimating means also predetermining a heat production ratio between the stator coil and the permanent magnet, and
    during operation of the motor, the magnet temperature is calculated based on the temperature of the stator coil and the cooling liquid, the heat production ratio, and the thermal resistance ratio.

2. A motor control device according to claim 1, wherein the control means controls the motor by switching between a PWM control and a square wave control, and
    the magnet temperature estimating means calculates the magnet temperature in response to a change of the heat production ratio caused by switching between the PWM control and the square wave control.

3. A motor control method for operating a motor having a stator, with a stator coil concentrically arranged on an outer side of a rotor having a permanent magnet, the motor control method comprising the steps of:
    detecting a temperature of the stator coil while the stator coil produces heat in response to operation of the motor;
    detecting a temperature of a cooling liquid which cools an outer periphery of the stator;
    estimating a temperature of the permanent magnet while the permanent magnet produces heat; and
    controlling the motor based on the estimated magnet temperature,
    wherein the magnet temperature estimating step predetermines a thermal resistance ratio, which is given by comparing a thermal resistance between the cooling liquid and the stator coil with a thermal resistance between the stator coil and the permanent magnet, the magnet temperature estimating means also predetermining a heat production ratio between the stator coil and the permanent magnet, and
    during operation of the motor, the magnet temperature is calculated based on the temperature of the stator coil and the cooling liquid, the heat production ratio and the thermal resistance ratio.

4. A motor control method according to claim 3, wherein the control step controls the motor by switching between a PWM control and a square wave control, and
    the magnet temperature estimating step calculates the magnet temperature in response to a change of the heat production ratio caused by switching between the PWM control and the square wave control.

5. A recording medium on which is recorded a motor control program for operating a motor having a stator with a stator coil concentrically arranged on the outer side of a rotor having a permanent magnet, the recording medium when executed by a computer causes the computer to execute the steps of:
    detecting a temperature of the stator coil while it produces heat in response to the operation of the motor;
    detecting a temperature of a cooling liquid which cools the outer periphery of the stator;
    estimating a temperature of the permanent magnet while it produces heat; and
    controlling the motor based on the estimated magnet temperature,
    wherein the magnet temperature estimating step predetermines a thermal resistance ratio, which is given by comparing a thermal resistance between the cooling liquid and the stator coil with a thermal resistance between the stator coil and the permanent magnet, the magnet temperature estimating step also predetermining a heat production ratio between the stator coil and the permanent magnet, and
    during operation of the motor, the magnet temperature is calculated based on the temperature of the stator coil and the cooling liquid, the heat production ratio, and the thermal resistance ratio.

6. A recording medium on which is recorded the motor control program according to claim 5, wherein
    the control step controls the motor by switching between a PWM control and a square wave control; and
    the magnet temperature estimating step calculates the magnet temperature in response to a change of the heat production ratio caused by switching between the PWM control and the square wave control.

* * * * *